US012808352B2

(12) United States Patent
Nassos et al.

(10) Patent No.: US 12,808,352 B2
(45) Date of Patent: Nov. 24, 2026

(54) WIND TURBINE INCLUDING PIVOTABLE BLADES AND ANNULAR SHROUD

(71) Applicants: George Peter Nassos, Glenview, IL (US); Samaneh Ahmadinejad, DeKalb, IL (US); Jean-Charles Poullain, Sainte Clotilde (FR)

(72) Inventors: George Peter Nassos, Glenview, IL (US); Samaneh Ahmadinejad, DeKalb, IL (US); Jean-Charles Poullain, Sainte Clotilde (FR)

( * ) Notice: Subject to any disclaimer, the term of this patent is extended or adjusted under 35 U.S.C. 154(b) by 0 days.

(21) Appl. No.: 18/966,874

(22) Filed: Dec. 3, 2024

(65) Prior Publication Data

US 2025/0179989 A1 Jun. 5, 2025

Related U.S. Application Data

(60) Provisional application No. 63/606,451, filed on Dec. 5, 2023.

(51) Int. Cl.
*F03D 7/02* (2006.01)
*F03D 1/04* (2006.01)
(Continued)

(52) U.S. Cl.
CPC ........... *F03D 7/0224* (2013.01); *F03D 1/046* (2023.08); *F03D 1/0667* (2023.08);
(Continued)

(58) Field of Classification Search
CPC ........ F03D 1/04; F03D 1/0606; F03D 1/0625; F03D 7/0224; F03D 1/0664; F03D 1/0667; F03D 17/029
See application file for complete search history.

(56) References Cited

U.S. PATENT DOCUMENTS 6,841,892 B1 1/2005 Le Nabour et al.
7,218,011 B2 5/2007 Hiel et al.
(Continued)

FOREIGN PATENT DOCUMENTS

CA 2523420 A1 11/2004
CA 2590918 A1 6/2006
(Continued)

OTHER PUBLICATIONS

Machine Translation of CN 106894939 (Year: 2017).*
Machine Translation of FR 2547360 (Year: 1983).*
Machine Translation of WO 2004099607 (Year: 2004).*

*Primary Examiner* — Brian O Peters
(74) *Attorney, Agent, or Firm* — Foley & Lardner LLP

(57) ABSTRACT

A wind turbine including a lower mount; a nacelle; a hub rotatably coupled to the nacelle and configured to rotate about a longitudinal axis of the hub; a generator housed within the nacelle and configured to convert kinetic energy of the hub to electricity; a plurality of pivotable blades coupled to the generator and configured to rotate with the hub, each pivotable blade of the plurality of pivotable blades configured to pivot about a longitudinal axis of the pivotable blade; and an annular shroud fixed to the lower mount and located radially outward of the plurality of pivotable blades, the annular shroud coupled to the nacelle by at least one support member that is inclined so as to extend frontward and radially outward from the nacelle to the annular shroud; wherein the lower mount is configured to passively rotate about a mast.

10 Claims, 10 Drawing Sheets

(51) Int. Cl.
*F03D 1/06* (2006.01)
*F03D 80/70* (2016.01)

(52) U.S. Cl.
CPC ...... *F03D 80/701* (2023.08); *F05B 2260/503* (2013.01); *F05B 2260/74* (2013.01)

(56) References Cited

U.S. PATENT DOCUMENTS

| | | | | |
|---|---|---|---|---|
| 7,956,482 | B2 | 6/2011 | Nies et al. | |
| 8,148,841 | B1 | 4/2012 | Apthorp | |
| 8,317,471 | B2 | 11/2012 | Axelsson et al. | |
| 8,593,010 | B2 * | 11/2013 | Ollgaard | F03D 80/85 290/55 |
| 10,077,762 | B2 * | 9/2018 | Fujiwara | F16D 41/067 |
| 2009/0180869 | A1 | 7/2009 | Brock | |
| 2009/0280008 | A1 | 11/2009 | Brock | |
| 2010/0270802 | A1 | 10/2010 | Presz et al. | |
| 2010/0314885 | A1 | 12/2010 | Presz et al. | |
| 2012/0230810 | A1 | 9/2012 | Al-Shibl | |
| 2013/0266439 | A1 * | 10/2013 | Rubak | F03D 1/04 415/208.1 |
| 2014/0227095 | A1 | 8/2014 | Minutin | |
| 2018/0017040 | A1 | 1/2018 | Lee | |

FOREIGN PATENT DOCUMENTS

| | | | | | |
|---|---|---|---|---|---|
| CN | 101487446 | B | | 7/2009 | |
| CN | 106894939 | A | * | 6/2017 | F03B 15/00 |
| FR | 2547360 | A1 | * | 12/1984 | F03D 7/0224 |
| KR | 20110062511 | A | | 6/2011 | |
| KR | 101509736 | B1 | | 4/2015 | |
| WO | WO-2004099607 | A2 | * | 11/2004 | F03D 7/0224 |
| WO | WO-2011/002979 | A2 | | 1/2011 | |

* cited by examiner

WIND TURBINE INCLUDING PIVOTABLE BLADES AND ANNULAR SHROUD

CROSS-REFERENCE TO RELATED PATENT APPLICATIONS

This application claims the benefit of and priority to U.S. Provisional Patent Application No. 63/606,451, filed Dec. 5, 2023, and incorporated herein by reference in its entirety and for all purposes.

BACKGROUND

The present disclosure relates generally to wind turbines. Wind turbines, while offering significant benefits in terms of renewable energy, have several challenges/drawbacks. Some such challenges and drawbacks include the visual impact on the surrounding area due to their size, the risk of critical failure at high wind speeds, little to no power output at low wind speeds, danger to wildlife, and electrical consumption while operating.

The scale of wind turbines can be quite large, often several hundred feet tall, which makes them highly visible in the landscape. This has raised aesthetic concerns among people who live in or near areas where wind farms are established.

Conventional wind turbines have a risk of critical failure as wind speeds increase and cause the blades to spin faster than they are designed for. Brakes are used to slow the rotation of wind turbine blades to avoid potential damage due to excessive speed. When winds are slow, wind turbines produce little to no power. As the wind shifts direction, the wind turbine must also adjust to maintain an optimum position for power generation. These adjustments can be slow (thus reducing energy output) and require energy consumption. Additionally, conventional wind turbines can pivot the wind turbine blades to minimize power output. Traditional shrouded wind turbines, however, do not have pivoting blades.

Wind turbines also pose threats to wildlife, especially birds and bats that may collide with the turbine blades. In cold climates, there is a risk of ice accumulating on the turbine blades and then being thrown off when the wind picks up or the turbines start turning. This poses a hazard to people or property in the vicinity.

Wind turbines themselves consume electricity to maintain operations like blade and direction adjustments, lighting, heating, cooling, and other functions. Though not substantial, this draw may require electricity from the grid when the turbine is not producing electricity (for example, due to low wind).

SUMMARY

For the aforementioned reasons, there is a need for a wind turbine that has a decreased visual and auditory impact, poses less threats to wildlife and surrounding property, and/or can adjust blade position and direction to respond to changing wind speeds and directions quickly and efficiently.

Certain embodiments of the present disclosure are directed to an apparatus and system that may satisfy this need.

According to one embodiment, a wind turbine comprises: a lower mount; a nacelle; a hub rotatably coupled to the nacelle and configured to rotate about a longitudinal axis of the hub; a generator housed within the nacelle configured to convert kinetic energy of the hub to electricity; a plurality of pivotable blades coupled to the generator and configured to rotate with the hub, each pivotable blade of the plurality of pivotable blades configured to pivot about a longitudinal axis of the pivotable blade; and an annular shroud fixed to the lower mount and located radially outward of the plurality of pivotable blades, the annular shroud coupled to the nacelle by at least one support member that is inclined so as to extend frontward and radially outward from the nacelle to the annular shroud; wherein the lower mount is configured to passively rotate about a mast.

According to one aspect, the plurality of pivotable blades are configured to pivot simultaneously.

According to another aspect, the plurality of pivotable blades are angled inward towards the longitudinal axis of the hub.

According to another aspect, the plurality of pivotable blades are cooperatively coupled to a piston of a linear actuator.

According to another aspect, each of the plurality of pivotable blades is cooperatively coupled to the piston by a rack-and-pinion gear mechanism.

According to another aspect, the plurality of pivotable blades are caused to pivot by movement of the piston of the linear actuator.

According to another aspect, the wind turbine further comprises a sensor configured to determine a wind speed proximate the wind turbine, wherein the linear actuator is communicatively coupled to the sensor and configured to cause the piston to move upon the wind speed reaching a threshold.

According to another aspect, the sensor is coupled to the annular shroud.

According to another aspect, the wind turbine further comprises a rotating electrical conduit to allow transmission of the converted electricity from the generator to a power grid.

According to another aspect, the rotating electrical conduit is housed within the lower mount.

According to another aspect, the wind turbine further comprises an upper electrical wire and a lower electrical wire electrically connected to the rotating electrical conduit, wherein the rotating electrical conduit allows for the upper electrical wire to rotate with the annular shroud while the lower electrical wire remains stationary.

According to another aspect, the annular shroud comprises vortex generators that induce turbulence around the annular shroud.

According to another aspect, the further comprises a first shaft of the generator coupled to a second shaft of the hub via a gearbox, wherein the gearbox converts a low-speed rotation of the second shaft into a high-speed rotation of the first shaft.

In some aspects, the techniques described herein relate to a blade-pivoting mechanism comprising: a linear actuator including a piston configured to move along a longitudinal axis; a gear rack fixed to an outer surface of the piston and extending parallel to the longitudinal axis of the piston, the gear rack including gear rack teeth; a pinion gear fixed to a radially inner portion of a shaft of a wind turbine blade, the pinion gear including pinion gear teeth interfacing with the gear rack teeth and configured to pivot the wind turbine blade upon movement of the piston; and a blade holder fixed to a front face of a rotating member of a generator and defining a channel; wherein the shaft of the wind turbine blade is rotatably disposed in the channel defined by the blade holder.

According to one aspect, the linear actuator is offset from the longitudinal axis.

According to another aspect, the linear actuator is housed in a hub for a wind turbine.

According to another aspect, the channel defined by the blade holder is disposed at an angle so as to position an outer end of the wind turbine blade forward of the hub.

According to another aspect, the blade-pivoting mechanism further comprises: an additional gear rack fixed to the outer surface of the piston and extending parallel to the longitudinal axis of the piston, the additional gear rack including gear rack teeth; an additional pinion gear fixed to a radially inner portion of a shaft of an additional wind turbine blade, the additional pinion gear including pinion gear teeth interfacing with the gear rack teeth of the additional gear rack and configured to pivot the additional wind turbine blade upon movement of the piston; and an additional blade holder fixed to the front face of rotating member of the generator and defining a channel; wherein the shaft of the additional wind turbine blade is rotatably disposed in the channel defined by the additional blade holder.

According to another aspect, the blade-pivoting mechanism further comprises a sensor configured to determine a wind speed proximate the blade-pivoting mechanism, wherein the linear actuator is communicatively coupled to the sensor and configured to cause the piston to move upon the wind speed reaching a threshold value.

According to another aspect, the channel defined by the blade holder includes an annular portion configured to receive a roller bearing, the roller bearing coupled to the shaft of the wind turbine blade.

These and other features, aspects, and advantages of the present invention will become better understood with reference to the following description and appended claims.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
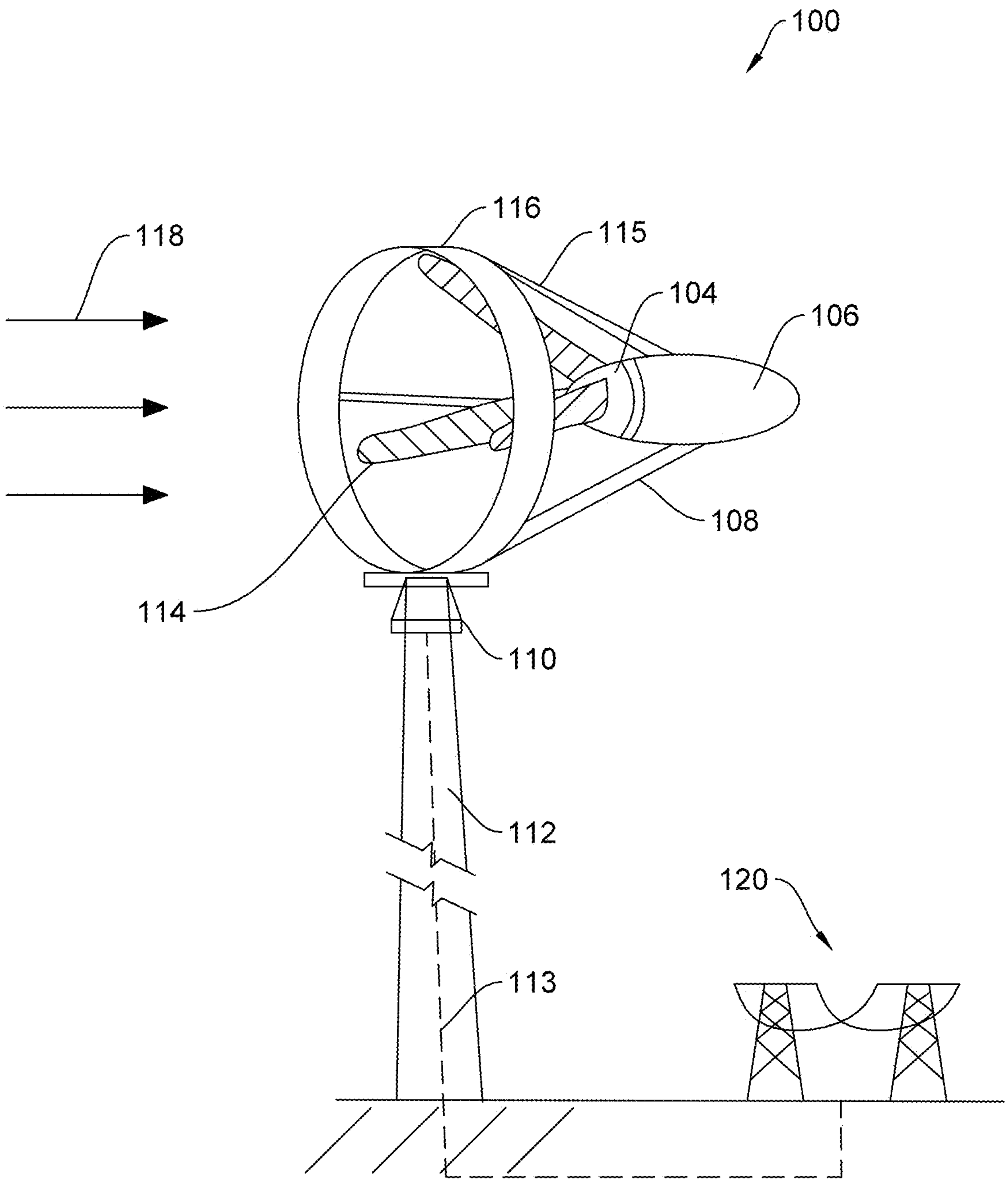
FIG. 1 shows a perspective view of a wind turbine with a blade-pivot mechanism, according to an exemplary embodiment.

Turning now to the figures, in which similar reference characters denote similar elements throughout the several views, FIG. 1 illustrates a wind turbine 100, which comprises a mast 112 extending vertically from a mounting location (e.g., ground, a structure, a vehicle, etc.), a lower mount 110 fixed to a top end of the mast 112, an annular shroud 116 rotatably fixed to the lower mount 110, a nacelle 106 coupled to the annular shroud 116 by a main nacelle support 108 and an annular shroud support 115, a hub 104 rotatably coupled to the nacelle 106, and one or more blades 114 pivotably coupled to the hub 104. In several embodiments, the nacelle 106 is offset horizontally from the mast 112 in a cantilevered position, with the annular shroud 116 being positioned substantially above the top end of the mast 112. The blades 114 may be in an angled orientation with the blades 114 extending from the hub 104 outwardly and forward to the annular shroud 116 at an angle so as to engage with the wind 118.

Figure 10A:
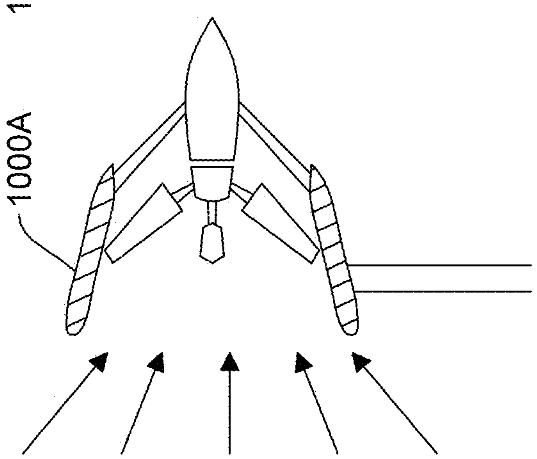
FIG. 10A shows a side view of a cross section of a wind turbine shroud, according to an exemplary embodiment.
Figure 10B:
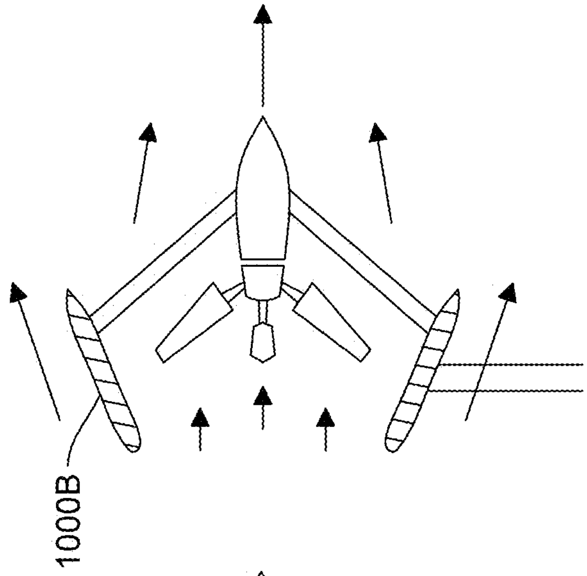
FIG. 10B shows a side view of a cross section of a wind turbine shroud, according to an exemplary embodiment.
Figure 10C:
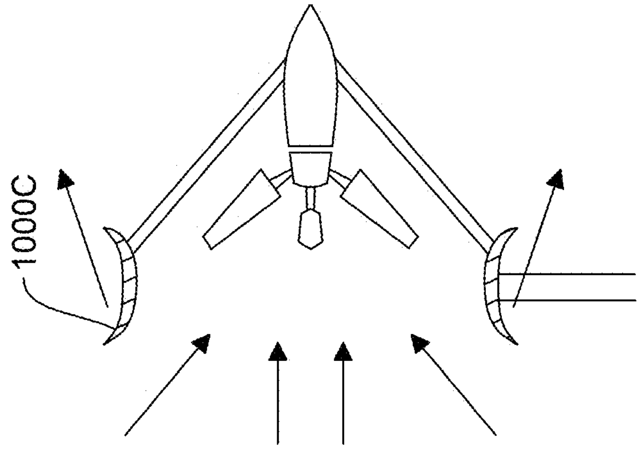
FIG. 10C shows a side view of a cross section of a wind turbine shroud, according to an exemplary embodiment.

The annular shroud 116 may have many different cross-sectional configurations. For example, the annular shroud 116 may have a uniform cross section along the length of the annular shroud 116. In some embodiments, the cross section of the annular shroud 116 is not uniform across the length of the annular shroud 116. As shown in FIG. 10A, the nozzle cross section 1000A can cause a nozzle effect, causing an increase of wind speed into the blade(s) 114 of FIG. 1. As shown in FIG. 10B, the annular shroud 116 of FIG. 1 can have a diffuser cross section 1000B that causes a diffuser effect to accelerate the wind speed into the blade(s) 114 of FIG. 1 due to turbulence generated at the trailing edge of the annular shroud 116 cross section. As shown in FIG. 10C, the annular shroud 116 of FIG. 1 may have a hybrid cross section 1000C that causes both a nozzle effect and a diffuser effect. In some embodiments, the annular shroud 116 of FIG. 1 may include vortex generators to induce turbulence surrounding the annular shroud 116.

The wind turbine mast 112 may be manufactured from a high-strength, lightweight material such as aluminum, steel, composite materials, including carbon fiber reinforced polymers (CFRPs) or glass fiber reinforced polymers (GFRPs). To enhance the aerodynamic efficiency, the mast 112 may incorporate a streamlined profile and/or surface modifications. The outer surface of the mast 112 may include specially designed airfoils, vortex generators, or other flow control devices to minimize drag and turbulence. These features optimize the flow of air around the mast 112, reducing forces due to wind pressure. To improve stability and reduce vibrations, the mast 112 may include internal structural reinforcements, such as strategic bracing or truss configurations. These reinforcements distribute loads evenly, reducing stress concentrations and minimizing the risk of structural failure. Additionally, damping mechanisms, such as tuned mass dampers or active control systems, can be integrated into the mast 112 to dampen vibrations. The mast 112 may include one or more means to ascend the mast 112, such as ladders, elevators, stairs, etc. These means to ascend the mast 112 may be positioned in the interior of the mast 112 or on the exterior of the mast 112.

While the present disclosure generally refers to the wind turbine 100 as an industrial-sized structure, it should be understood that the wind turbine 100 may also be manufactured in a smaller and/or portable form factor. For example, in some embodiments, the wind turbine 100 may be disassembled and packaged in a carrying case (e.g., suitcase, bag, box, etc.) for travel or emergency power-generating situations. In one embodiment, the wind turbine 100 may be designed and manufactured with a size compatible with mounting on the upper surface of a vehicle to generate electricity in an emergency situation (e.g., charging an electric vehicle's electrical storage bank on a side of a road).

Returning now to FIG. 1, the mast 112 may include a number of different foundation techniques for coupling the mast 112 to the ground. These methods include gravity, a shallow/slab foundation (e.g., plan slab, stube and pedestal, stub tower embedded in tapered slab, and slab held down by rock anchors), piles (e.g., pile group and cap, solid mono-pile, and hollow mono-pile), octagonal shallow mat, and rammed aggregate piers under footings or mats. In a variety of these foundation methods, piers are driven into the ground to stabilize the mast 112 and prevent the mast 112 from tipping or shifting. In some smaller embodiments, the wind turbine 100 may be used without a mast 112, and the lower mount 110 may be mounted to an existing structure (e.g., a vehicle, a home, a telephone pole, a bridge, a signpost, a tree, etc.) through fastening means (e.g., bolts, screws, nails, rivets, clips, clamps, threaded fasteners, adhesives, etc.).

The mast 112 may also house an electrical conduit 113. The electrical conduit 113 may be an electrically conductive material for transmitting electrical power generated by the wind turbine 100 to a power grid 120 and/or other electrical storage structure (e.g., a battery). The electrical conduit 113 may include a wire, or plurality of wires, made of any suitable electrically conductive material (e.g., copper, aluminum, etc.) and may also include an electrically nonconductive sheathing (e.g., ceramic, rubber, plastic, synthetic fiber, etc.) around the electrically conductive material. The electrical conduit 113 may be of a sufficient gauge to transmit safely the maximum electrical output generated from the wind turbine 100.

The lower mount 110 is fixed to the top of the mast 112. The lower mount 110 is configured to couple the annular shroud 116 to the mast 112 and allow the annular shroud 116 to rotate about the mast 112 to adjust for the changing wind direction. The lower mount 110 may be fastened to the mast 112 by various means, including, but not limited to, threaded fasteners such as nuts and bolts, adhesives and epoxies, hooks, magnets, rivets, soldering, welding, friction, and nailing. In some embodiments, the lower mount 110 is configured to rotate about the mast 112 and the annular shroud 116 is fixedly coupled to the lower mount 110. In other embodiments, the lower mount 110 is configured to be fixedly coupled to the mast 112 and the annular shroud 116 is configured to rotate about the lower mount 110. A rotating electrical conduit 232 is housed within the lower mount, as shown in FIG. 2.

Figure 2:
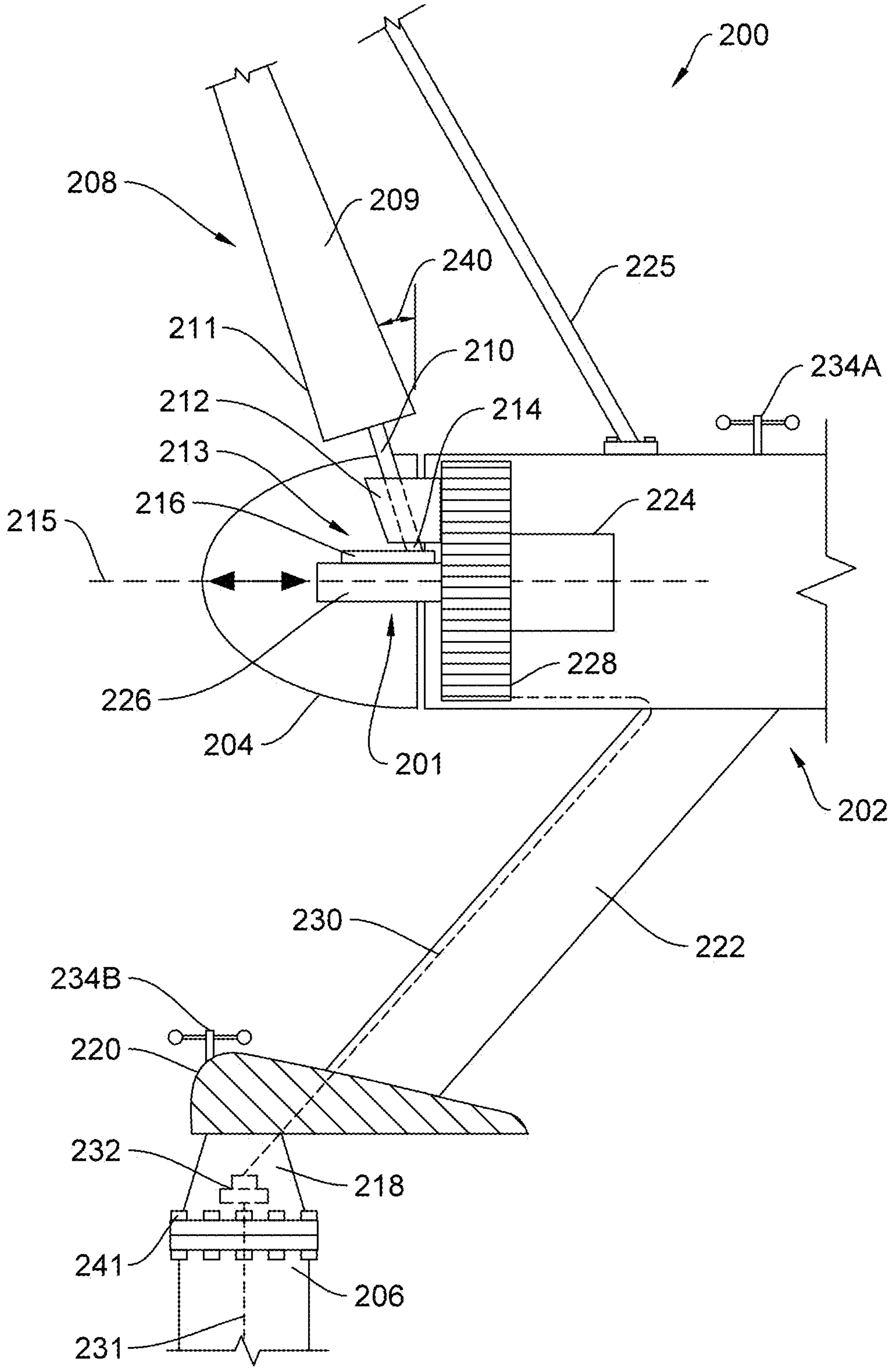
FIG. 2 shows a side view of the blade-pivot mechanism of FIG. 1, according to an exemplary embodiment.

Turning now to FIG. 2, a wind turbine 200 is shown. In some embodiments, the wind turbine 200 is substantially similar to the wind turbine 100 of FIG. 1. In FIG. 2, a mast 206 is shown coupled to a lower mount 218 with threaded fasteners 241. Within the lower mount 218, a rotating electrical conduit 232 is shown. The rotating electrical conduit 232 may be a rotary electrical connector, an electrical slip ring, rotating collector, swivel, or electrical rotatory joint. The rotating electrical conduit 232 is used to transmit the electrical power between an upper electrical wire 230 and a lower electrical wire 231 while allowing the upper electrical wire 230 to rotate independently of the lower electrical wire 231. The rotating electrical conduit 232 allows for the use of two independently moving wires (e.g., the upper electrical wire 230 and the lower electrical wire 231) to transmit electrical power while the annular shroud 220 rotates about the lower mount 218. The rotating electrical conduit 232 allows for the upper electrical wire 230 to rotate with the annular shroud 220 while the lower electrical wire 231 remains stationary.

The upper electrical wire 230 extends from the rotating electrical conduit 232, through the main nacelle support 222, to the generator 228. The main nacelle support 222 is angled upward and outward from the annular shroud 220, so as to position the nacelle 202 horizontally offset from the mast 206. In so doing, the nacelle 202 is able to act as a tail for the wind turbine 200, thus positioning the wind turbine 200 to face upwind as the wind changes directions. This results in a reduction of weight, power consumption, and costs as the wind turbine 200 does not need to include (1) a separate tail component and/or (2) additional electrical motors and components to actively rotate the wind turbine 200 to face the wind. This reduction in components results in a corresponding reduction in costs.

As stated above, the main nacelle support 222 extends from the annular shroud 220 upwards and outwardly to position the nacelle 202 offset from the mast 206. This allows the nacelle 202 to act as a tail of the wind turbine 200 to passively rotate the nacelle to be positioned in line with the direction of the wind.

Wind turbine tails, also known as wind vanes, are useful in the operation and control of wind turbines. Generally, the tail's function is to orient the turbine's hub or nacelle into the direction of the wind by aligning itself with the prevailing wind flow. The generic wind turbine tail is part of the wind turbine's yaw system, which is responsible for rotating the entire turbine or nacelle horizontally to face the wind. The yaw system typically consists of a yaw drive, motor, and various sensors that detect the wind direction. When the wind blows from a different direction, the wind vane of the tail senses the change and communicates this information to the yaw drive system. The yaw drive then activates the motor to rotate the turbine or nacelle horizontally. This movement reorients the rotor blades into the new wind direction. By aligning the rotor blades with the wind, the wind turbine tail helps optimize power generation.

The wind turbine tail also assists in managing wind loads on the structure. When wind direction changes suddenly or wind speeds exceed certain limits, the tail can help the turbine maintain stability by adjusting the yaw position and mitigating the effects of gusts or turbulent winds.

Because of the offset nacelle 202 position, as shown in FIGS. 1-2, the wind turbine 200 does not need a dedicated tail to assist with yaw rotation. Rather, the nacelle 202 acts as the tail by placing the already required componentry of the nacelle 202 away from the axis of yaw rotation (e.g., a longitudinal axis extending through the mast 206 and the lower mount 218). This offset position from the axis of rotation of the upper portion of the wind turbine 200 allows the wind to interact with the offset nacelle 202 and passively position it in line with the blowing wind. In other words, little or no electrical input is needed to position the wind turbine 200 in line with the direction of the wind. Further, no independent tail component is needed align the wind turbine 200 with the wind because the offset position of the nacelle 202 acts as a tail.

The generator 228 is housed within the nacelle 202 and is configured to generate electrical power from the rotation of the generator 228 caused by the rotation of the one or more blades 208. The generator 228 converts the kinetic energy of the wind blowing past blade 208 into electrical energy to be transmitted through the upper electrical wire 230, the rotating electrical conduit 232, and the lower electrical wire 231 to a power storage facility/structure (e.g., a battery), a power grid (e.g., the power grid 120 of FIG. 1), or some other electrical component that utilizes electrical energy (e.g., a motor). In some embodiments, a shaft of the generator 228 is coupled to a shaft of the hub 204 by means of a gearbox. This gearbox may convert a low-speed rotation of the shaft of the hub 204 into a high-speed rotation of the shaft of the generator 228. One or more of the shaft of the hub 204 and the shaft of the generator 228 may be mounted to one or more bearings to decrease friction while rotating.

Figure 3:
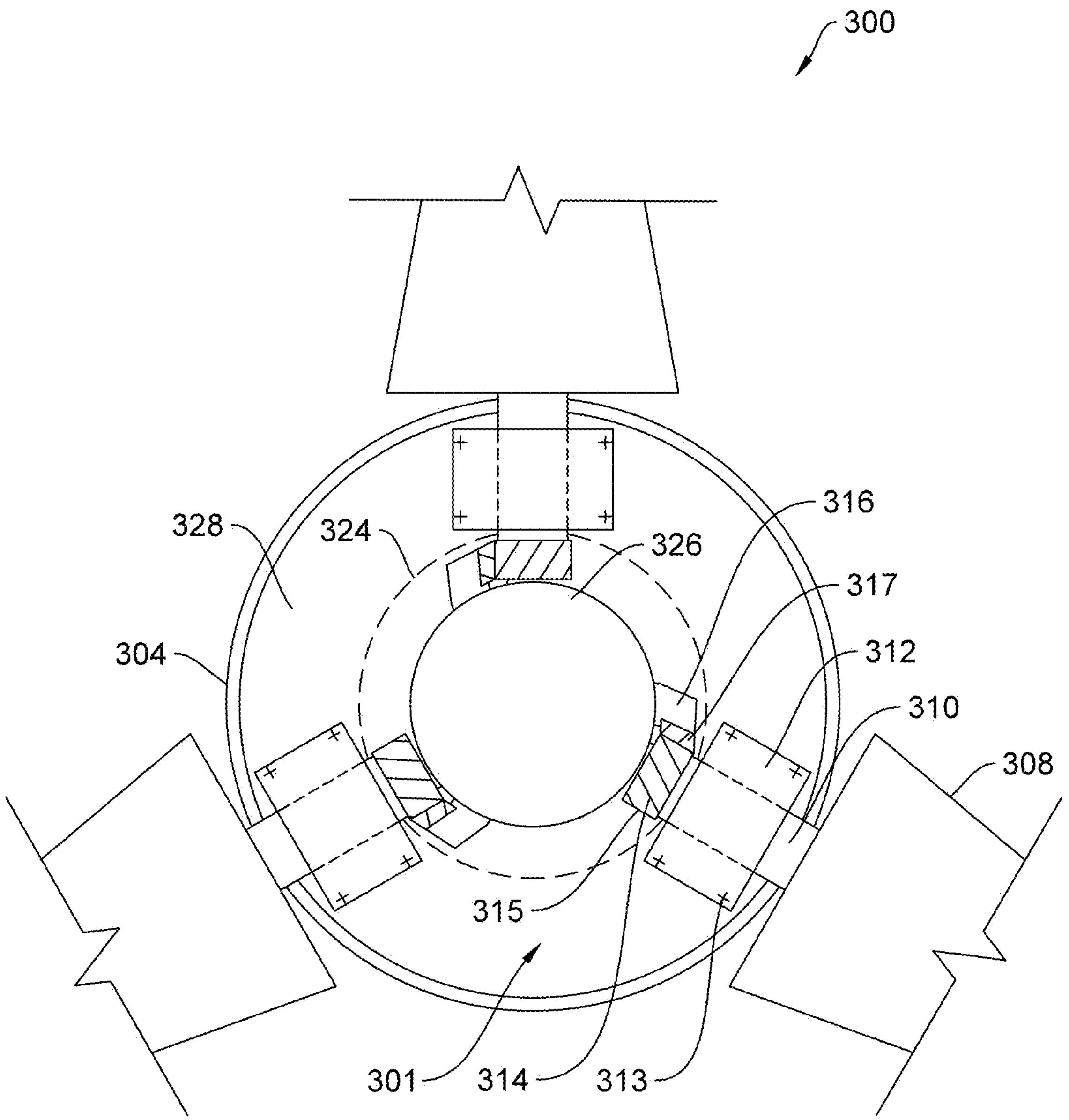
FIG. 3 shows a front view of the blade-pivot mechanism of FIG. 1, according to an exemplary embodiment.
Figure 4:
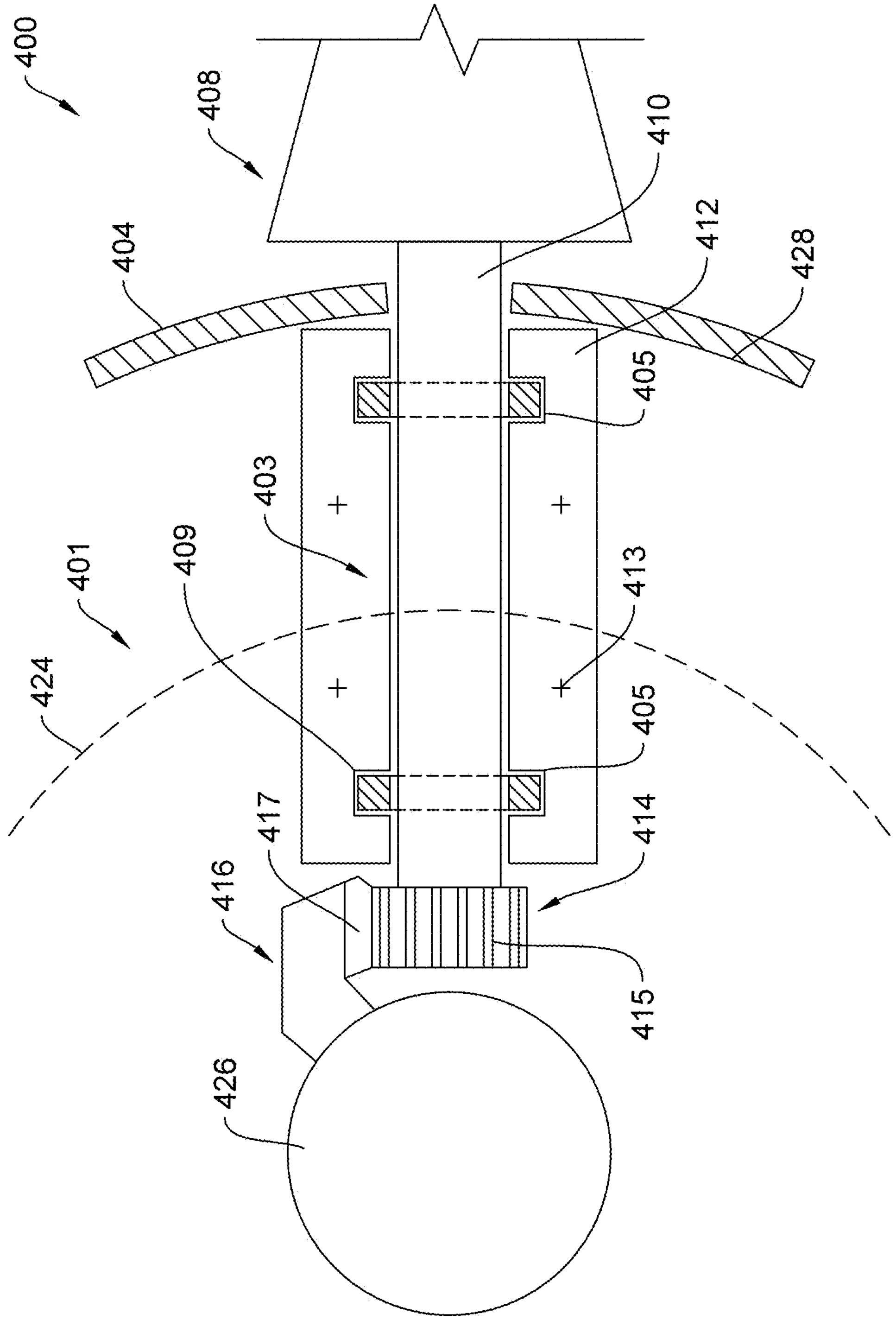
FIG. 4 shows a front view the blade-pivot mechanism of FIG. 1, with a section view of a blade holder, according to an exemplary embodiment.

The generator 228 may be an electric generator based on the principles of electromagnetic induction. It comprises several main components including a rotor, and a stator. While the figures illustrate an external rotor generator, the generator 228 may be either an internal or external rotor generator. In the external rotor generator configuration, as shown in FIGS. 2-4, the one or more blades 208 are mounted to a face of the rotor of the generator 228 by one or more blade holders 212. The blade holder 212 is shown, and described, in greater detail in FIGS. 4, 7-8, and the accompanying descriptions herein.

Turning now to FIG. 4, a section view of a blade holder 412 is shown. The blade holder 412 is an exemplary embodiment of the blade holder 212 of FIG. 2. FIG. 4 illustrates a blade-pivoting mechanism 401 of a wind turbine 400 comprising a linear actuator 424, a piston 426 coupled to a gear rack 416 with one or more gear rack teeth 417, the one or more gear rack teeth coupled to one or more pinion gear teeth 415 of a pinion gear 414, the pinion gear 414 fixed to the shaft 410 of the wind turbine blade 408.

The shaft 410 of the wind turbine blade 408 extends through a channel 403 formed by the blade holder 412. In some embodiments, the channel 403 comprises one or more annular sections 405 which house one or more roller bearings 409 or other friction-reducing elements (e.g., bushings, fluids, grease, etc.). According to an embodiment, the one or more roller bearings 409 are coupled to the shaft 410 and the blade holder 412 by friction. In some embodiments, the roller bearings 409 are coupled to the shaft 410 and the blade holder 412 by adhesive or other coupling mechanism (e.g., a mechanical connection). The use of one or more roller bearings 409 allows the wind turbine blade 408 to pivot about a longitudinal axis of the wind turbine blade 408 with decreased friction, thus increasing the efficiency of the blade-pivoting mechanism 401 and the wind turbine 400 more generally. This reduction in friction may also decrease the design requirements for the plurality of components within the blade-pivoting mechanism 401 (e.g., the strength of the gear rack teeth 417, the power output of the linear actuator 424, the gearing ratio of the gear rack 416 to the pinion gear 414, etc.). As illustrated in various figures herein, the shaft 410 extends out of a hub 404, and the blade holder 412 is mounted to a rotor of a generator 428 by one or more mounting points 413.

Figure 7:
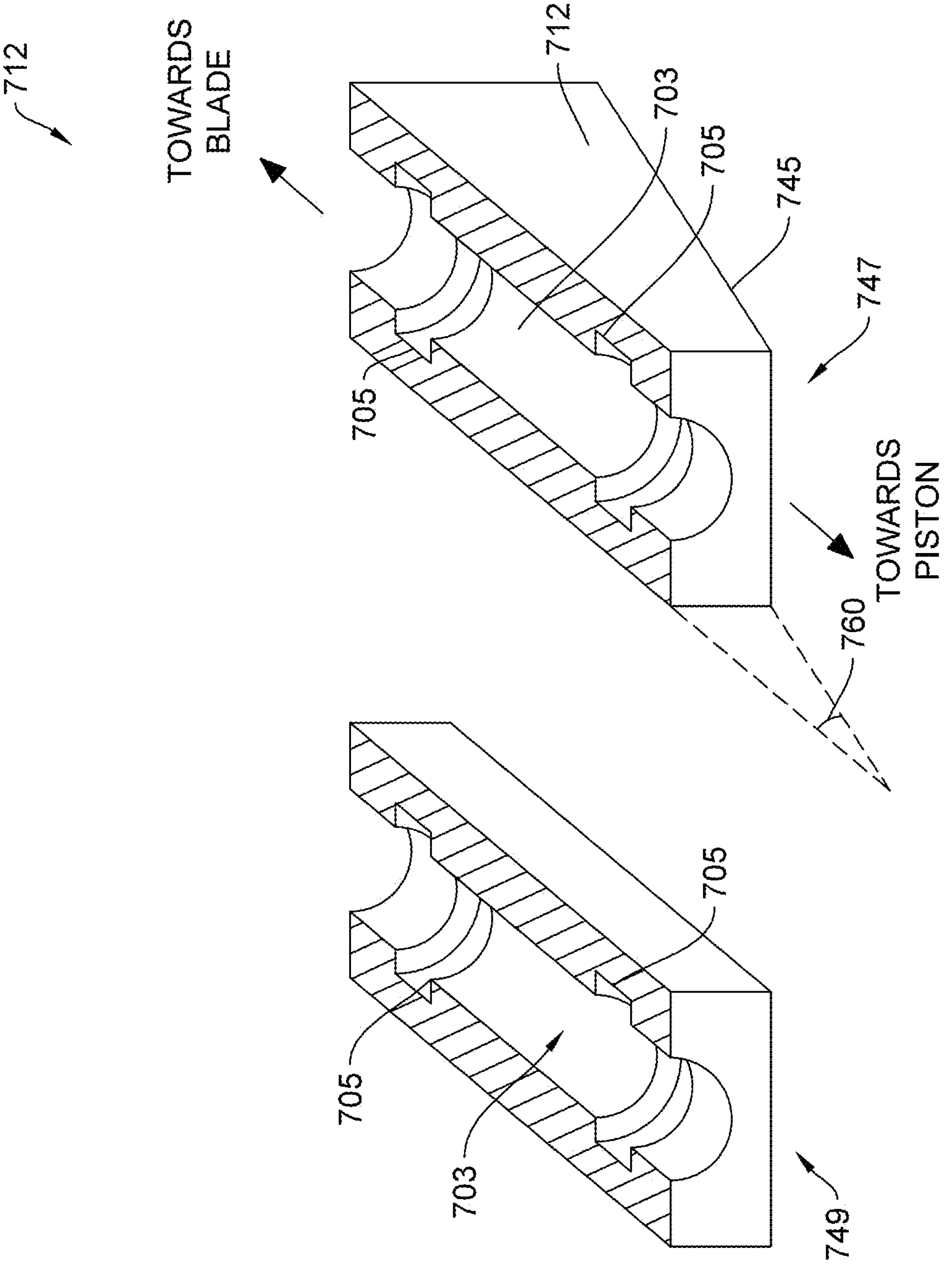
FIG. 7 shows a perspective section view of the blade holder of FIG. 4, according to an exemplary embodiment.
Figure 8:
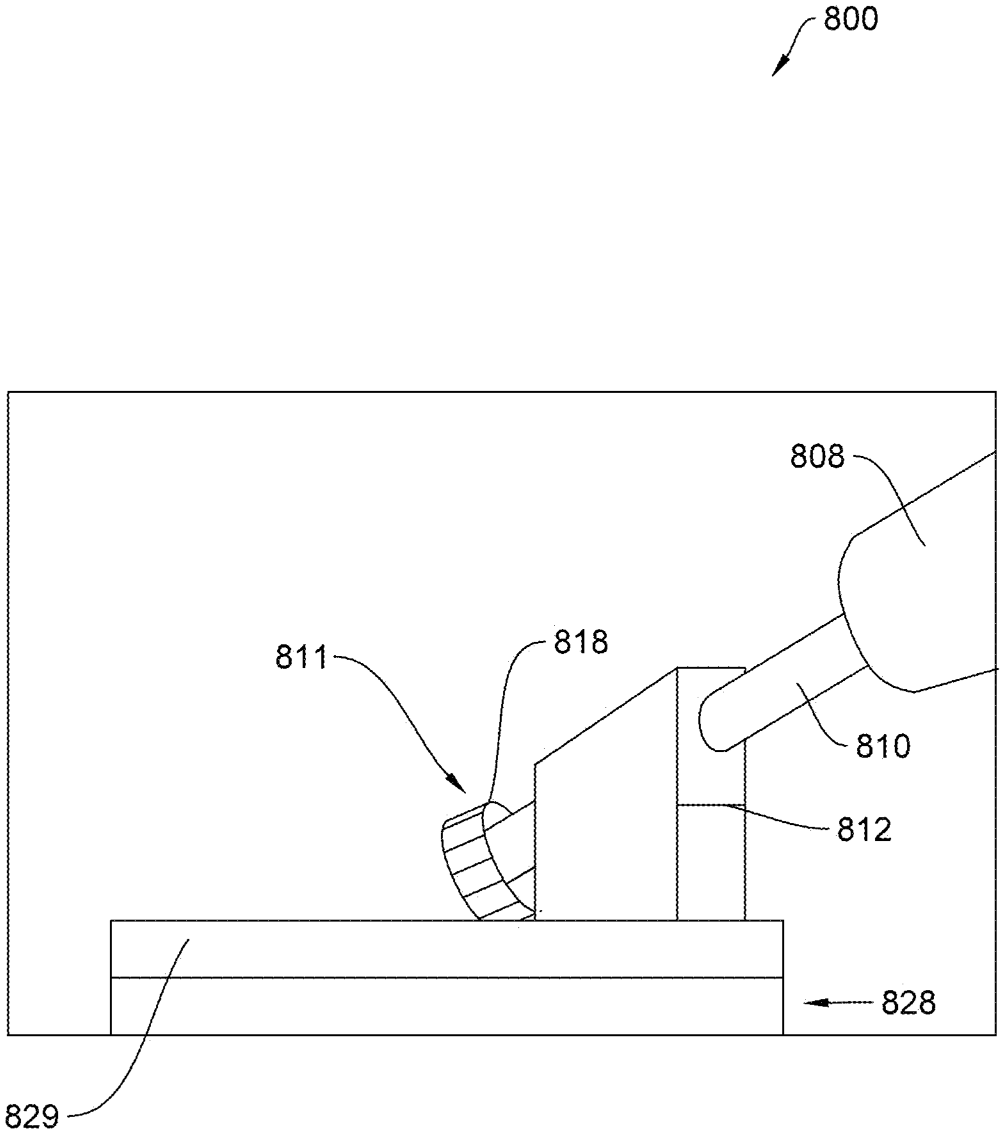
FIG. 8 shows a perspective view of the blade holder of FIG. 4, according to an exemplary embodiment.

The channel 403 of the blade holder 412 is disposed within the blade holder 412 at an angle (as shown in FIGS. 7-8) so as to position an outer end of the wind turbine blade 408 forward of the hub 404 (as shown in FIG. 2 with the blade 208 angled forward of the hub 204 at blade angle 240). This angling of blade 408 allows for decreasing the size (and cost) of an annular shroud associated with the wind turbine 400 (e.g., the annular shroud 116 of FIG. 1) because a circumference of the blade rotation of blade 408 about a longitudinal axis of the hub 404 will be reduced as the blade angle 240 of FIG. 2 increases. In some embodiments, the annular shroud need only be larger than the blade's 408 rotation circumference. As such, the annular shroud can be manufactured smaller (and cheaper) as the rotation circumference of the blade 408 decreases.

Turning now to FIG. 7, a perspective section view of a blade holder 712. In some embodiments, the blade holder 712 is an exemplary embodiment of the blade holder 212 of FIG. 2. The blade holder 712 is shown in two portions: a base portion 747 that mounts to a generator face (e.g., generator 228 of FIG. 2), and a top portion 749. In some embodiments, the top portion 749 and the base portion 747 are a single unitary blade holder 712. In other embodiments, the top portion 749 and the base portion 747 are separate components that are coupled together through one or more means for coupling (e.g., threaded fasteners, adhesives, welding, soldering, rivets, etc.). The base portion 747 and the top portion 749, when together, form a channel 703 through which a shaft (e.g., the shaft 210 of FIG. 2) of a wind turbine blade may extend. The channel 703 may include one or more annular portions 705 that extend radially from the channel 703. The annular portion 705 may be configured to receive a roller bearing or bushing to act as a friction reducer between the shaft and the blade holder 712.

The channel 703 of the blade holder 712, in some embodiments, may extend through the blade holder 712 at a blade angle 760, as measured from a mounting face 745. The blade angle 760 is the angle that the shaft of the wind turbine blade is angled forward (as measured from the mounting face 745).

Turning now to FIG. 8, a perspective view of a blade holder 812 of a wind turbine 800 is shown with a shaft 810 of a blade 808 extending through the blade holder 812. As described in greater detail in FIG. 4, the shaft 810 has a pinion hear 818 affixed at an inner end 811 of the shaft 810. The blade holder 812 is mounted to a generator front 829 of a generator 828. In some embodiments, the generator front 829 is (or is coupled to) a rotor of the generator 828.

Returning to FIG. 2, the blade holders 212 fix the blade 208 to the rotor of the generator 228. In an exemplary embodiment, the wind turbine 200 comprises three blades 208. However, it should be noted that any number of blades 208 may be used in the implementation of the present disclosure. While described in the singular, it should be understood that the description of the blade 208 applies to any number of blades used in the implementation of the present disclosure. As the wind passes the blade 208, the blade 208 rotates the rotor of the generator 228 and, in doing so, induces an electrical current in the internal stator. This induced electricity is then transmitted through the upper electrical wire 230, the rotating electrical conduit 232, and the lower electrical wire.

Figure 5:
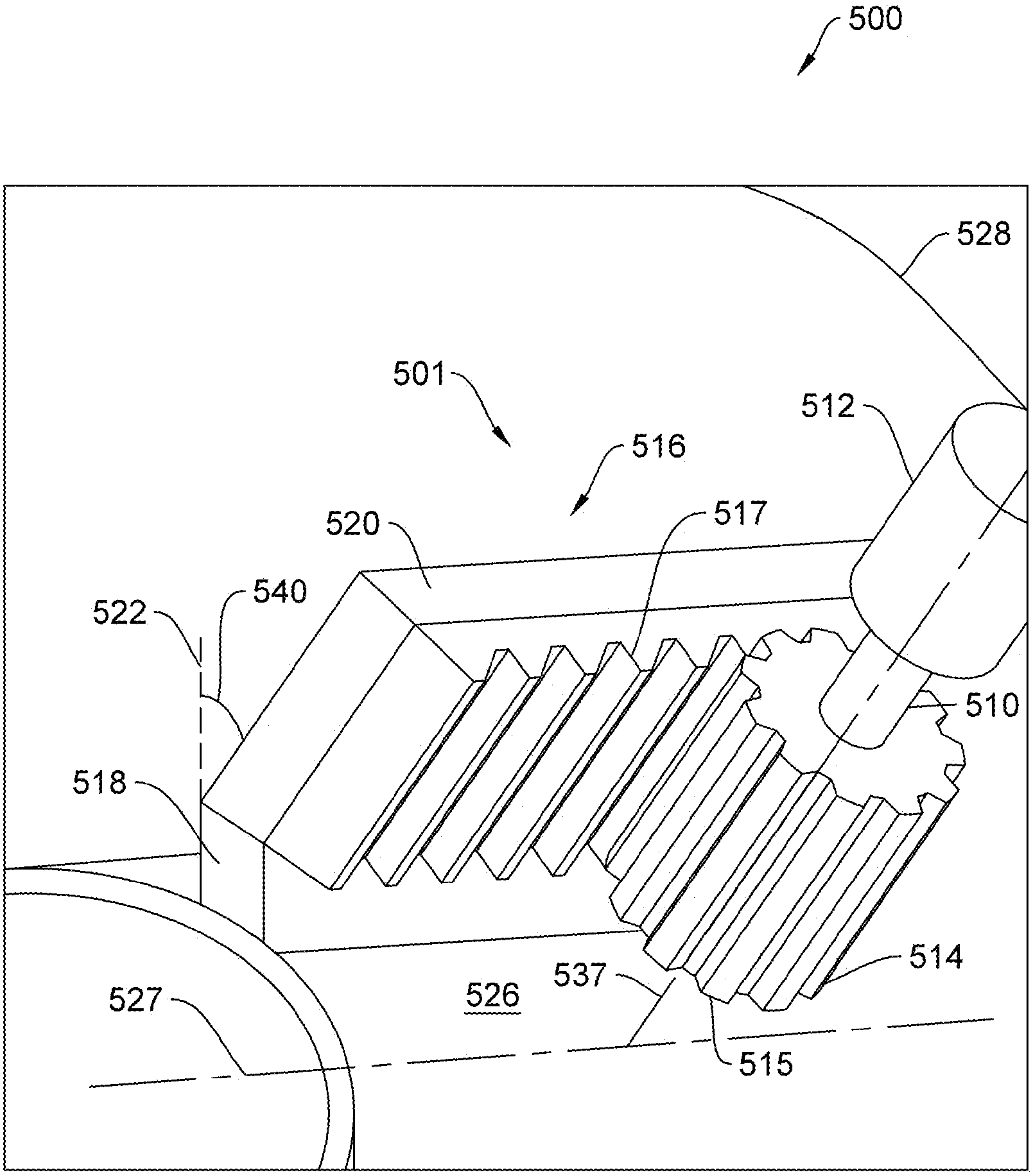
FIG. 5 shows a gear rack of the blade-pivot mechanism of FIG. 1, according to an exemplary embodiment.

The blade 208 comprises a foil 209, a shaft 210, and a pinion gear 214. The foil 209 is the radially outward surface of the blade 208 and is manufactured in a shape such that when it is placed in the movement of wind it has a suitable angle of attack to generate lift and cause movement (e.g., rotation about a longitudinal axis 215 of the rotor). The shaft 210 extends from inner end 211 of the foil 209 and interfaces with the blade holder 212. The shaft 210 may extend through the foil or attach only at the inner end 211 of the foil 209. The shaft 210 may be of any suitable material that has sufficient strength and resiliency to support the foil 209 while the foil 209 undergoes various forces (e.g., lateral loads, axial loads, compressive loads, tensile loads) as it engages with the wind. The shaft 210 also accommodates a pinion gear 214 fixed thereto. The pinion gear 214 may be cylindrical or disk-like in shape. In some embodiments, the pinion gear 214 is tapered. The pinion gear 214 may be affixed to the shaft 210 with various methods, including threaded fasteners, welding, soldering, a keyed joint (as illustrated in FIG. 5), a collar, friction, and rivets. In other embodiments, the pinion gear 214 is machined onto the shaft 210 so that the two components are a single unit.

The teeth of the pinion gear 214 are configured to interface with teeth (e.g., gear rack teeth 517 of FIG. 5) of a gear rack 216 in a rack-and-pinion mechanism 213. The gear rack 216 is fixed along a length of a x, the piston 226 being a member of a linear actuator 224. In some embodiments, the piston 226 moves laterally along the longitudinal axis 215 of the rotor of the generator 228. The linear actuator 224 may be a pneumatic actuator, hydraulic actuator, electric actuator, piezoelectric actuator, or electroactive polymer actuator. Regardless of the embodiment of the linear actuator 224, the linear actuator 224 is used to actuate the piston 226 laterally along the longitudinal axis 215 of the rotor to cause a geared interaction between the gear rack 216 and the pinion gear 214, thus resulting in a rotation of the blade 208. A more detailed illustration of the rack-and-pinion mechanism 213 comprising the pinion gear 214 and the gear rack 216 is shown in FIGS. 5-6.

Turning now to FIG. 5, a perspective view of a blade-pivoting mechanism 501 of a wind turbine 500 is shown. In some embodiments, the wind turbine 500 may be an exemplary embodiment of the wind turbine 200 of FIG. 2. The wind turbine 500 includes a blade-pivoting mechanism 501 comprising a piston 526, a generator 528, a gear rack 516 with one or more gear rack teeth 517, a pinion gear 514 with one or more pinion gear teeth 515, the pinion gear 514 coupled to a shaft 510. The shaft 510 extends through a channel formed by the blade holder 512, as described in FIG. 4. While not illustrated in FIG. 5, the gear rack teeth 517 and the pinion gear teeth 515 may be tapered. In other embodiments, the gear rack teeth 517 and the pinion gear teeth 515 are helical teeth.

In some embodiments, the gear rack 516 is an exemplary gear rack 216 of FIG. 2. According to some embodiments, the gear rack 516 includes a vertical body 518 extending outwardly from a piston 526. Extending from the vertical body 518 at a pitch angle 540 is an angled body 520. In some embodiments, the angled body 520 and the vertical body 518 make up a single body unit with two portions (e.g., the angled body 520 and the vertical body 518). In other embodiments, the vertical body 518 and the angled body 520 are separate components coupled together by one or more fastening means. The gear rack 516 also includes one or more gear rack teeth 517. The one or more gear rack teeth 517 are configured to interface with one or more pinion gear teeth 515. The gear rack 516 extends along a portion of the piston 526 parallel to a longitudinal axis 527 of the piston 526.

The interface of the gear rack 516 and the corresponding pinion gear 514 allows the piston 526 to pivot a blade associated with the pinion gear about a longitudinal axis 537 of the blade shaft 510 as the piston 526 travels along the longitudinal axis 527. In an exemplary embodiment, three gear racks 516 extend parallel along the piston 526, spaced equidistant about the circumference of the piston 526 to pivot multiple blades (coupled to multiple blade shafts 510) simultaneously.

The angled body 520 extends at a pitch angle 540 from vertical 522 so as to engage with the associated pinion gear 514 while permitting the longitudinal axis 537 of the blade shaft 510 to extend through the longitudinal axis 527 of the piston 526. The vertical body 518 allows for clearance between the bottom of the gear rack teeth 517 and the outer surface of the piston 526.

Figure 6A:
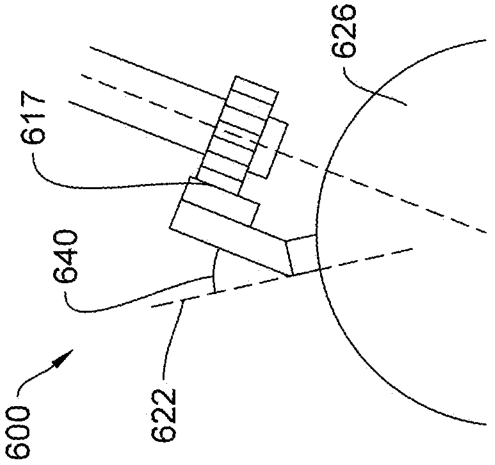
FIG. 6A shows a front view of the gear rack of FIG. 5, according to an exemplary embodiment.
Figure 6B:
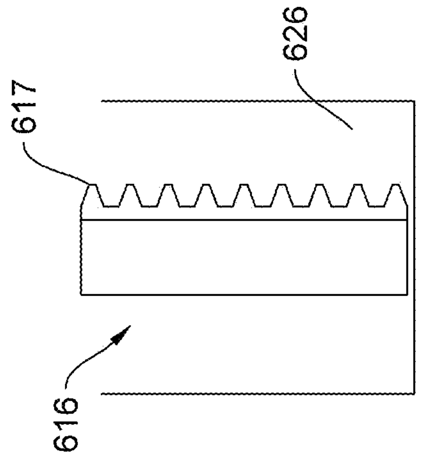
FIG. 6B shows a top view of the gear rack of FIG. 5, according to an exemplary embodiment.
Figure 6C:
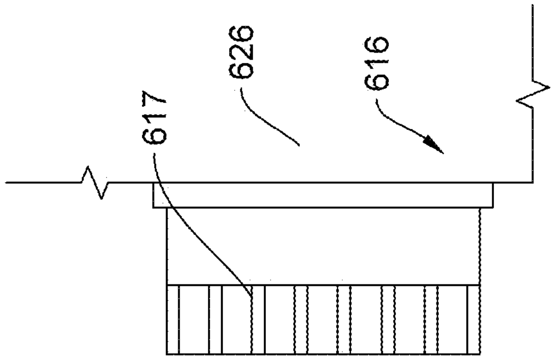
FIG. 6C shows a side view of the gear rack of FIG. 5, according to an exemplary embodiment.

Turning now to FIGS. 6A-6C, various views of a gear rack 616 of a wind turbine 600 are shown. FIG. 6A illustrates a front view of the gear rack 616. FIG. 6B illustrates a top view of the gear rack 616. FIG. 6C illustrates a side view of the gear rack 616.

FIG. 6A illustrates a pitch angle 640 of the gear rack 616 in relation to a vertical axis 622, as described in FIG. 5. In addition, FIG. 6A illustrates gear rack teeth 617 of the gear rack 616 and a piston 626 to which the gear rack 616 is fixed.

FIG. 6B illustrates the relation between the gear rack 616 and the piston 626 from a top view.

FIG. 6C illustrates the relationship between the gear rack 616, the gear rack teeth 617, and the piston 626. While a single gear rack 616 is illustrated in the FIGS. 6A-6C, it should be understood that a plurality of gear racks 616 may be disposed on the piston 626 to be used to pivot simultaneously a plurality of wind turbine blades, as illustrated in FIG. 1.

Returning to FIG. 2, a hub 204 houses at least a portion of the linear actuator 224, including the piston 226. The hub 204, in some embodiments, comprises one or more holes in the outer surface to permit the shaft 210 (or other portion of the blade 208) to extend out of the hub 204. The hub 204 may be physically coupled to or referenced to the blades 208 so as to rotate as the blades 208 rotate about the generator 228. The hub 204 also acts as a protective barrier for the nacelle 202, the pinion gear 214 and the gear rack 216, the blade holder 212, the generator 228, the shaft 210, etc. In some embodiments, the generator 228 is housed within the hub 204. In other embodiments, the generator 228 is housed in the nacelle 202. In some embodiments, the generator 228 is housed partly in the hub 204 and partly in the nacelle 202.

According to some embodiments, the wind turbine 200 comprises a wind speed sensor 234A affixed to the outer surface of the nacelle 202. The wind speed sensor 234A may be a cup anemometer, a propeller anemometer, a sonic anemometer, a hot wire anemometer, a pitot tube, or wind vane. The wind speed sensor 234A is used to determine the wind speed and direction of the wind proximate the wind turbine 200. In some embodiments, a wind speed sensor 234B is used to determine the wind speed of the wind prior to passing through the blades 208 (e.g., by being placed on the annular shroud 220). In some embodiments, the wind speed sensors 234A, 234B are in communication to determine the efficiency of the wind turbine 200 based on the wind speed difference between wind speed sensor 234A and wind speed sensor 234B. In some embodiments, the measured wind speed from wind speed sensor 234A may be less than the wind speed at wind speed sensor 234B. To determine the wind speed at the annular shroud 220 with the wind speed sensor 234A, a transforming equation may be applied to the measured wind speeds from the wind speed sensor 234A to offset the measured wind speed at the nacelle 202.

In some embodiments, the wind speed sensors 234A, 234B are used to determine the position to pivot the blade 208. As the wind speed decreases (as measured by the wind speed sensors 234A, 234B), the linear actuator 224 may laterally adjust the piston 226 to pivot the blade 208 (through the gear rack 216 and pinion gear 214) into a more aggressive attack angle. This allows the blade 208 to produce more lift with less wind speed. As the wind speed increases (as measured by the wind speed sensors 234A, 234B), the linear actuator 224 may laterally adjust the piston 226 to pivot the blade 208 (by means of a blade-pivoting mechanism 201) into a less aggressive angle of attack. This reduces the lift experienced by the blade 208 to decrease the blade 208 speed, thus protecting the wind turbine 200 during high winds. This allows the wind turbine 200 to operate at a constant and safe output independent of wind speed and/or direction. As described herein, the linear actuator 224 is used to laterally adjust the piston 226 to pivot all blades 208 simultaneously. In some embodiments, a processor (e.g., a processor 906 of FIG. 9) of the wind turbine 200 may utilize predetermined speed thresholds in determining when to actuate the blade-pivoting mechanism 201, as described in FIG. 9. In some embodiments, the blade-pivoting mechanism 201 comprises the gear rack 216, pinion gear 214, the piston 226, and/or the linear actuator 224.

The annular shroud 220 is supported by at least one annular shroud support 225. According to an embodiment, the annular shroud support 225 extends from an upper, outer surface of the nacelle 202 frontward (e.g., forwardly) and radially outwardly to an exterior surface of the annular shroud. The annular shroud support 225 supports the annular shroud 220 and is coupled to the nacelle 202 and annular shroud 220 through one or more fastening means (e.g., threaded fasteners, adhesives, welding, soldering, friction fits, etc.).

Turning now to FIG. 3, a front view of a system 300 with a blade-pivoting mechanism 301 is shown. In some embodiments, the blade-pivoting mechanism 301 is an exemplary embodiment of the blade-pivoting mechanism 201 of FIG. 2. The blade-pivoting mechanism 301 may comprise a linear actuator 324 (including a piston 326), a gear rack 316 (comprising at least one gear rack tooth 317) fixed to the piston 326, and a pinion gear 314 (including at least one pinion gear tooth 315) interfacing with the pinion gear 314 by a meshing of the at least one gear rack tooth 317 with the at least one pinion gear tooth 315. In an exemplary embodiment, the gear rack 316 and the pinion gear 314 each comprise a plurality of gear teeth. The blade-pivoting mechanism 301 may be housed in a hub 304 or a nacelle (such as the nacelle 202 of FIG. 2). Alternatively, or in addition, a portion of the blade-pivoting mechanism 301 may be housed in the hub 304 while the remainder of the blade-pivoting mechanism 301 is located in the nacelle. In some embodiments, at least a portion of the blade-pivoting mechanism 301 moves between the hub 304 and the nacelle (e.g., the moving piston 326).

In some embodiments, the linear actuator 324 receives at least a portion of the piston 326 along a longitudinal axis of the linear actuator 324. In some embodiments, the piston 326 is offset from the longitudinal axis of the linear actuator 324. The linear actuator 324 is configured to move the piston 326 laterally (i.e., in and out of the linear actuator 324) along the longitudinal axis of the piston 326. The linear actuator 324 may be configured to adjust the lateral position of the piston 326 in a variety of methods. For example, the linear actuator 324 may be a hydraulic actuator, pneumatic actuator, electric actuator, piezoelectric actuator, and/or magnetic linear actuator. By using one (or more) of the above techniques, the linear actuator 324 laterally adjusts the position of the piston 326. While the piston 326 may be coupled to the linear actuator 324 as a piston and cylinder (e.g., in a hydraulic or pneumatic actuator configuration), in some embodiments, the piston 326 is coupled to the linear actuator 324 with gears (e.g., in an embodiment in which the linear actuator 324 is an electric actuator).

The gear rack 316 is coupled to the piston 326. In some embodiments, the gear rack 316 is fixed to the piston 326 along the length of the piston 326 in a position parallel to the longitudinal axis of the piston 326. The gear rack teeth 317 engage with the pinion gear teeth 315 of the pinion gear 314. As the piston 326 adjusts laterally, the gear rack 316 rotates the pinion gear 314. The pinion gear 314 is fixed to the shaft 310 (or to a portion thereof) of the wind turbine blade 308. Because the pinion gear 314 is coupled to the shaft 310 of the wind turbine blade 308, the wind turbine blade 308 pivots as the gear rack 316 rotates the pinion gear 314. In an exemplary embodiment, a plurality of gear racks 316 are fixed to the piston 326 equidistance from each other around the outer perimeter of the piston 326 and simultaneously pivot a plurality of wind turbine blades 308 as the piston 326 is linearly actuated by the linear actuator 324. While a single gear interface is shown between the gear rack 316 and the pinion gear 314, it should be understood that any gearing ratio or configuration of a plurality of gears may be used to interface between the linear motion of the piston 326 and the rotational pivoting of the wind turbine blade 308.

As shown in FIG. 3, a blade holder 312 is mounted to a front face of a generator 328 at a mount location(s) 313. The wind turbine blade 308 is coupled to the blade holder 312 by the shaft 310. The shaft 310 of the wind turbine blade 308 extends through a channel formed by the blade holder 312, as further described in FIG. 4.

Figure 9:
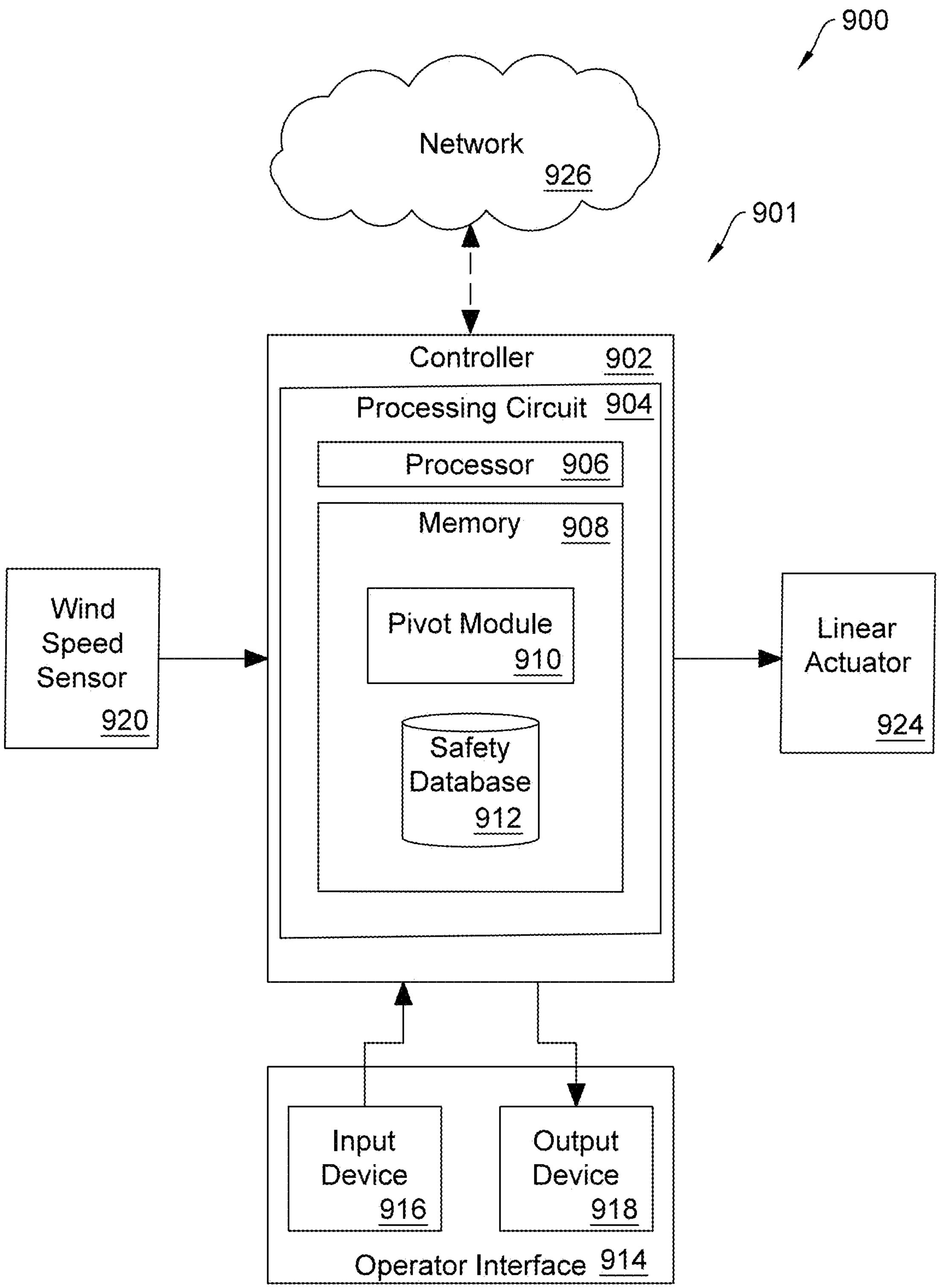
FIG. 9 shows a schematic diagram of the blade-pivot mechanism of FIG. 1 and corresponding systems, according to an exemplary embodiment.

Turning now to FIG. 9, a block diagram of an exemplary control system 901 of a wind turbine 900 is illustrated.

The control system 901 of the wind turbine 900 may include a controller 902, a processing circuit 904, an operator interface 914, a wind speed sensor 920, and a linear actuator 924. The controller 902 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components.

The processing circuit 904 may comprise a processor 906, and a memory 908. The memory 908 may include a pivot module 910 and/or a safety database 912. The processing circuit may include an ASIC, one or more FPGAs, a DSP, circuits containing one or more processing components, circuitry for supporting a microprocessor, a group of processing components, or other suitable electronic processing components. In some embodiments, the processing circuit 904 is configured to execute computer code stored in the memory 908 to facilitate the methods described herein. The memory 908 may be any volatile or non-volatile computer-readable storage medium capable of storing data or computer code relating to the activities described herein. According to an exemplary embodiment, the memory 908 includes computer code modules (e.g., executable code, object code, source code, script code, machine code, etc.) configured for execution by the processing circuit 904. In some embodiments, the controller 902 may represent a collection of processing devices (e.g., servers, data centers, etc.). In such cases, the processing circuit 904 represents the collective processors of the devices, and the memory 908 represents the collective storage devices of the devices.

In some embodiments, the memory 908 may include a pivot module 910 with instructions that, when executed by the processing circuit, perform the various methods described herein. The controller 902 is configured to receive wind speed sensor data (e.g., wind speed, wind direction, changes in wind parameters) from the wind speed sensor 920. The wind speed sensor may also collect additional non-wind related information (e.g., temperature, humidity, dew point, etc.). The wind speed data and any other non-wind related information collected from the wind speed sensor 920 may be transmitted wirelessly (e.g., through Bluetooth, WiFi, 5G, LTE, cellular, or other communication protocol) or by wire to the controller 902. The pivot module 910 may include instructions to use the data collected by the wind speed sensor 920 to execute certain instructions or protocols relating the operation of the wind turbine 900 (e.g., pivoting one or more wind turbine blades through the use of a blade-pivot mechanism). In an exemplary embodiment, the pivot module 910 includes instructions for pivoting one or more blades of the wind turbine 900. In some embodiments, the pivot module 910 includes instructions that, when executed by the processor, cause the linear actuator 924 (e.g., the linear actuator 224 of FIG. 2) to adjust a position of a piston (e.g., piston 226 of FIG. 2) and thereby pivot the position of one or more blades (e.g., blade 208 of FIG. 2).

The pivot module 910 may access the safety database 912 in determining protocols for when to actuate the linear actuator 924. For example, the safety database 912 may host, either locally or remotely, information associated with the safe and/or efficient operation of the wind turbine 900 (e.g., safe operating speeds, ideal pivot position, max wind speed thresholds, minimum wind speed thresholds, and/or ideal operating parameters generally). The pivot module 910 may use the information stored in the safety database 912 to alter the operation (e.g., pivot one or more blades, adjust direction of a nacelle, apply a mechanical brake, turn on lights, initiate heating of one or more components, etc.) of the wind turbine 900 to result in a safe and or efficient operation of the wind turbine 900 as determined by the protocols defined in the pivot module 910 instructions. In some embodiments, an operator of the wind turbine 900 may interact with the operator interface 914 to set one or more parameters of the pivot module 910 (e.g., max operating speed threshold, minimum operating speed threshold, maximum wind threshold, minimum wind threshold, etc.). The operator interface 914 may comprise an input device 916 (e.g., a keyboard, joystick, mouse, one or more buttons, sliders, etc.) and/or an output device 918 (e.g., a display, a speaker, and/or one or more lights). The operator may use the input device 916 to select and set various parameters and instructions of the pivot module 910. In some embodiments, the controller 902 is connected to a network 926 through one or more communication protocols (e.g., WiFi, Bluetooth, cellular, 5G, LTE, radio, wired, etc.). In this way, the wind turbine 900 may be in communication with other wind turbines, a remote operator device, a power grid, etc. In some embodiments, the pivot module 910 and the safety database 912 may be updated through the network 926 with information from another wind turbine, the remote operator, and/or a power grid.

In another embodiment, the safety database 912 may also include data, protocols, rules, etc. relating to start-up and shutdown speeds for the wind turbine 900. For example, the processing circuit 904 may access the safety database 912 to determine at which speeds to enable the wind turbine 900 to begin turning to generate power and when to shut down the wind turbine 900 from spinning due to excessive speeds. This startup and shutdown may be implemented through the use of the pivot module 910 or by applying/removing a braking system. In some embodiments, these operations are executed by a direct drive controller.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the wind turbine 100 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A wind turbine comprising:

a lower mount configured to passively rotate about a mast;

a nacelle;

a hub rotatably coupled to the nacelle and configured to rotate about a longitudinal axis of the hub;

a generator housed within the nacelle and configured to convert kinetic energy of the hub to electricity;

a plurality of pivotable blades coupled to the generator and configured to rotate with the hub, each pivotable blade of the plurality of pivotable blades configured to pivot about a second longitudinal axis of the pivotable blade, wherein the plurality of pivotable blades are cooperatively coupled to a piston of a linear actuator by a rack-and-pinion gear mechanism;

an annular shroud fixed to the lower mount and located radially outward of the plurality of pivotable blades, the annular shroud coupled to the nacelle by at least one support member that is inclined so as to extend frontward and radially outward from the nacelle to the annular shroud; and a sensor configured to determine a wind speed proximate the wind turbine, wherein the linear actuator is communicatively coupled to the sensor and configured to cause the piston to move upon the wind speed reaching a threshold.

2. The wind turbine of claim 1, wherein the plurality of pivotable blades are configured to pivot simultaneously.

3. The wind turbine of claim 1, wherein the plurality of pivotable blades are angled inward towards the longitudinal axis of the hub.

4. The wind turbine of claim 1, wherein the plurality of pivotable blades are caused to pivot by movement of the piston of the linear actuator.

5. The wind turbine of claim 1, wherein the sensor is coupled to the annular shroud.

6. The wind turbine of claim 1, further comprising a rotating electrical conduit to allow transmission of converted electricity from the generator to a power grid.

7. The wind turbine of claim 6, wherein the rotating electrical conduit is housed within the lower mount.

8. The wind turbine of claim 6, further comprising an upper electrical wire and a lower electrical wire electrically connected to the rotating electrical conduit, wherein the rotating electrical conduit allows for the upper electrical wire to rotate with the annular shroud while the lower electrical wire remains stationary.

9. The wind turbine of claim 1, wherein the annular shroud comprises vortex generators that induce turbulence around the annular shroud.

10. The wind turbine of claim 1, further comprising a first shaft of the generator coupled to a second shaft of the hub via a gearbox, wherein the gearbox converts a low-speed rotation of the second shaft into a high-speed rotation of the first shaft.

* * * * *